US009085131B1

(12) United States Patent
Van Denend

(10) Patent No.: US 9,085,131 B1
(45) Date of Patent: Jul. 21, 2015

(54) END SEAL FOR AN INK CHAMBER OF A PRINTING MACHINE

(75) Inventor: Mark E. Van Denend, Lackawaxen, PA (US)

(73) Assignee: Valley Holdings, LLC, Bryan, OH (US)

( * ) Notice: Subject to any disclaimer, the term of this patent is extended or adjusted under 35 U.S.C. 154(b) by 420 days.

(21) Appl. No.: 13/491,716

(22) Filed: Jun. 8, 2012

(51) Int. Cl.
B41F 9/06 (2006.01)
B41F 31/02 (2006.01)
F16J 15/16 (2006.01)
F16J 15/02 (2006.01)

(52) U.S. Cl.
CPC ............... B41F 9/068 (2013.01); B41F 31/027 (2013.01); F16J 15/024 (2013.01); F16J 15/027 (2013.01); F16J 15/16 (2013.01)

(58) Field of Classification Search
CPC ....... B41F 31/027; B41F 9/068; F16J 15/024; F16J 15/025; F16J 15/3292
USPC .......... 101/350.6, 366; 277/605, 645
See application file for complete search history.

(56) References Cited

U.S. PATENT DOCUMENTS 4,590,855 A * 5/1986 Schommer et al. .......... 101/157
5,150,651 A 9/1992 Flores
5,182,992 A * 2/1993 Rogge ........................ 101/363
5,662,042 A * 9/1997 Compton et al. ............ 101/483
6,629,496 B1 * 10/2003 Boose et al. ................. 101/363
6,672,207 B2 1/2004 Kolbe et al.
6,739,248 B2 5/2004 Kolbe et al.
7,597,761 B2 10/2009 Van Denend
8,925,455 B2 * 1/2015 Foley ........................ 101/350.6
2003/0051619 A1 * 3/2003 Rogge ........................ 101/350.6
2004/0261640 A1 12/2004 Maccagni et al.
2009/0000499 A1 * 1/2009 Boose et al. ................. 101/363
2009/0193990 A1 * 8/2009 Van Denend .............. 101/350.6
2012/0049465 A1 * 3/2012 Foley ........................ 277/500

* cited by examiner

Primary Examiner — Kristina Fulton
Assistant Examiner — Nicholas L Foster
(74) Attorney, Agent, or Firm — Richard M. Goldberg

(57) ABSTRACT

An end seal for a fluid chamber which supplies fluid to a roll, includes a generally parallelepiped compressible member having first and second opposite sides and including a first end section having a first inclined planar upper surface, a second end section having a second inclined planar upper surface, and a central section which connects together the first and second end sections, the central section having an arcuate upper surface for receiving the roll, the arcuate upper surface connected to the first and second inclined planar upper surfaces at respective apices; and at least one pressure relieving recess positioned in the compressible member at a position below at least one apex, each pressure relieving recess extending through one side of the compressible member and terminating short of the opposite side of the compressible member so as to define a membrane of the compressible member thereat.

9 Claims, 3 Drawing Sheets

END SEAL FOR AN INK CHAMBER OF A PRINTING MACHINE

BACKGROUND OF THE INVENTION

The present invention relates to an end seal for an ink chamber of a printing machine, and more particularly, to an end seal having a longer operating life for use with a flexographic printing machine.

Conventionally, in printing machines, such as flexographic printing machines, an ink transfer or anilox roll transfers ink to an adjacent plate roll for printing. Ink is supplied to the anilox roll from an ink chamber defined by a chamber housing which partially surrounds the anilox roll. Specifically, ink is supplied through an ink supply tube and then through an ink supply line in the chamber housing, into the ink chamber. In like manner, ink is removed from the ink chamber through an ink return line in the chamber housing and then through an ink return tube.

In order to prevent the escape of ink from the chamber, while ensuring that the ink enters the cells in the anilox roll and has a predetermined volume on the anilox roll, doctor and sealing blades are provided at the entry and exit positions of the anilox roll relative to the ink chamber. The blades are fixed to the chamber housing so that the blades overhang the chamber housing and contact the anilox roll.

With this arrangement, the outer surface of the anilox roll passes through the ink chamber and picks up ink for printing. The ink is metered by means of the doctor blade held to the outlet end of the chamber housing, and sealed with a sealing blade held to the inlet end, with the free ends of the blades being in contact with the outer surface of the anilox roll.

A seal is provided at each end of the blade, that is, at each end of an anilox roll for sealing the ends thereof. Examples of such arrangements are shown in U.S. Pat. Nos. 7,597,761; 6,739,248; 6,672,207; and 5,150,651; and U.S. Patent Publication No. 2004/0261640, the entire disclosures of which are incorporated herein by reference.

Each seal is formed by a compressible body. Since the seals provided at each end of the anilox roll function to seal the ends of the ink chamber, each seal must lie against the peripheral surface of the rotating anilox roller. As a result, each seal is therefore exposed to mechanical stresses as well as wear. Further, during the printing operation, the blades, which press against the anilox roll, also wear. The geometry of the sealing function between the anilox roll, the two blades and the end seal changes.

Conventionally, each end of a blade sits upon a flat supporting area of the respective seal. As a result, there is not much flexibility at the opposite ends of the blades where they are held by the chamber seals. Because there is more force by the seals on each blade, that is, at the ends of the blades where they are held, the ends of the blades are less capable of flexing or bending at these points. As a result, there is uneven wear on the ends of the blades adjacent the seals, which tends to cause more wear and more leakage of ink at the ends of the anilox roll. Further, ink tends to ride under the blade, that is, between the blade and the flat supporting area of the seal, causing the blade to lift up away from the seal, thereby resulting in still more leakage. Thus, the place where the seal, anilox roll and blades join, is particularly susceptible to leakage.

SUMMARY OF THE INVENTION

Accordingly, it is an object of the present invention to provide an end seal which relieves the pressure at a position where the seal and doctor blade meet.

It is another object of the present invention to provide an end seal which has less rigidity at a position where the seal, anilox roll and doctor blade meet.

It is still another object of the present invention to provide an end seal having a longer operating life.

In accordance with an aspect of the present invention, an end seal for a fluid chamber which supplies fluid to a roll, comprises a generally compressible member having first and second opposite sides and including a first end section having a first inclined planar upper surface, a second end section having a second inclined planar upper surface, and a central section which connects together the first and second end sections, the central section having an arcuate upper surface for receiving the roll, the arcuate upper surface connected to the first and second inclined planar upper surfaces at respective apices; and at least one pressure relieving recess positioned in the compressible member at a position below at least one connection of said arcuate upper surface and first and second inclined planar upper surfaces, each pressure relieving recess extending through at least one side of the compressible member and terminating so as to define a membrane of the compressible member thereat.

Each pressure relieving recess can take various forms, such as an inverted V-shaped configuration, an inclined planar cross-sectional configuration, a small circular cross-sectional configuration, and a horizontal planar cross-sectional configuration, although the present invention is not limited thereby.

Each pressure relieving recess preferably extends below the central section and one end section.

A wear pad seats on the upper surface of the central section and at least partially on the upper surfaces of the first and second end sections. Preferably, the wear pad is made from felt. However, other materials such as ultra-high molecular weight polyethylene (UHMWPE) or polyester, may be used as a wear pad.

The compressible member is preferably made from a material selected from the group consisting of foam, rubber, plastic and composite materials.

Each pressure relieving recess terminates so as to define the membrane of the compressible member thereat. The membrane functions and is defined to prevent ink from flowing from the inside of the chamber to the outside through the recess.

The above and other objects, features and advantages of the invention will become readily apparent from the following detailed description thereof which is to be read in connection with the accompanying drawings.

DETAILED DESCRIPTION

Figure 1:
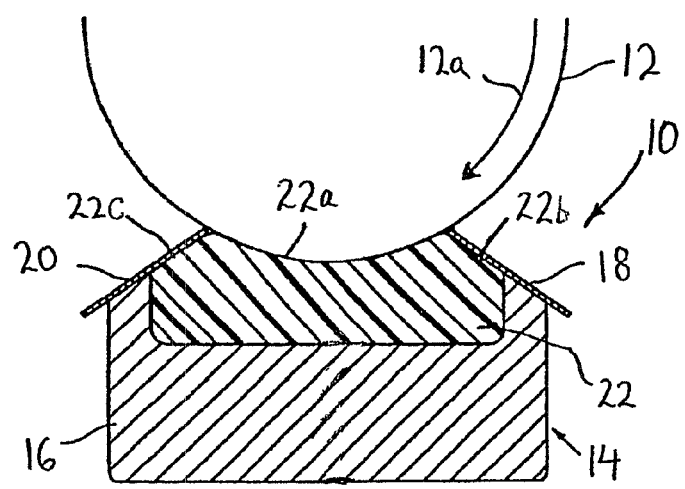
FIG. 1 is a cross-sectional view of a conventional doctor and sealing blade seal in association with an anilox roll.

Referring to the drawings in detail, and initially to FIG. 1 thereof, there is shown a conventional doctor and sealing blade sealing assembly 10. Conventionally, in printing machines, such as flexographic printing machines, an ink transfer or anilox roll 12 transfers ink to an adjacent plate roll (not shown) for printing. Ink is supplied to anilox roll 12 from an ink chamber 14 defined by a chamber housing 16 which is adjacent to and may partially surround anilox roll 12. Anilox roll 12 rotates in the direction of arrow 12a.

In order to prevent the escape of ink from ink chamber 14, while ensuring that the ink enters the cells in anilox roll 12 and has a predetermined volume on anilox roll 12, sealing and doctor blades 18 and 20 are provided at the entry and exit positions of anilox roll 12 relative to ink chamber 14. Blades 18 and 20 are fixed to chamber housing 16 by a blade holder (not shown) so that blades 18 and 20 overhang chamber housing 16 and contact anilox roll 12. Blades 18 and 20 are placed at an angle against the periphery of anilox roll 12 and help to define ink chamber 14 which extends along the length of anilox roll 12.

Seals 22 are provided at each end of anilox roll 12 to seal the ends of ink chamber 14. Each seal 22 has an upper concave surface 22a which lies against the peripheral surface of the rotating anilox roll 12. The edges of upper concave surface 22a continue in downwardly sloping flat supporting surfaces 22b and 22c which support blades 18 and 20, respectively.

With this arrangement, the outer surface of anilox roll 12 passes through ink chamber 14 and picks up ink for printing. The ink is metered by means of doctor blade 20 held to the outlet end of chamber housing 16, and sealed with sealing blade 18 held to the inlet end, with the free ends of blades 18 and 20 being in contact with the outer surface of anilox roll 12.

Each seal 22 is formed by a compressible body. Since the seals 22 provided at each end of the anilox roll 12 function to seal the ends of the ink chamber 14, each seal 22 must lie against the peripheral surface of the rotating anilox roll 12. As a result, each seal 22 is therefore exposed to mechanical stresses as well as wear. Further, during the printing operation, the blades 18 and 20, which press against the anilox roll 12, also wear. The geometry of the sealing function between the anilox roll 12, the two blades 18 and 20 and the end seals 22 change.

Conventionally, each end of a blade 18, 20 sits upon a flat supporting area 22a, 22b of the respective seal 22. As a result, there is not much flexibility at the opposite ends of the blades 18, 20 where they are held by the chamber seals 22. Because there is more force by the seals 22 on each blade 18, 20, that is, at the ends of the blades 18, 20 where they are held, the ends of the blades 18, 20 are less capable of flexing or bending at these points. As a result, there is uneven wear on the ends of the blades 18, 20 adjacent the seals 22, which tends to cause more wear and more leakage of ink at the ends of the anilox roll. Further, ink tends to ride under the blade 18, 20, that is, between the blade 18, 20 and the flat supporting area 22a, 22b of the seal 22, causing the blade 18 to lift up away from the seal 22, thereby resulting in still more leakage. Thus, the place where the seal 22, anilox roll 12 and blades 18, 20 join, is particularly susceptible to leakage.

Figure 2:
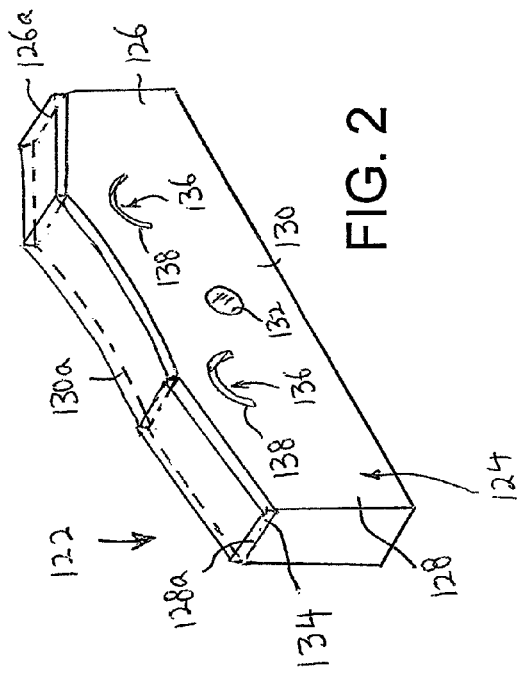
FIG. 2 is a perspective view of an end seal according to a first embodiment of the present invention.
Figure 3:
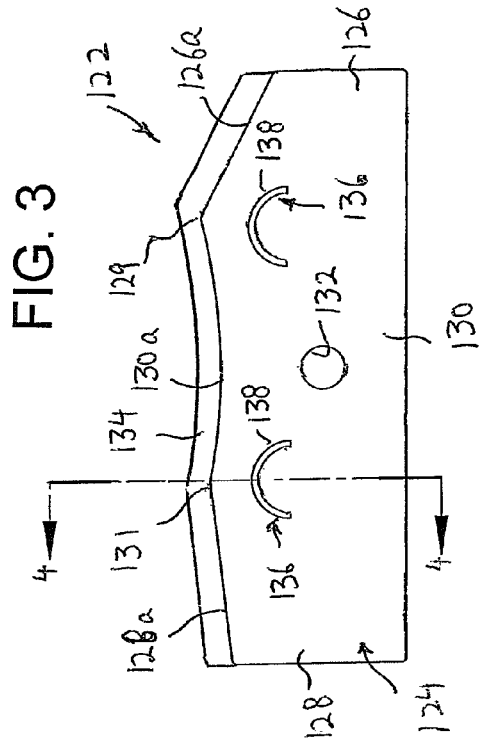
FIG. 3 is a side elevational view the end seal of FIG. 2.
Figure 4:
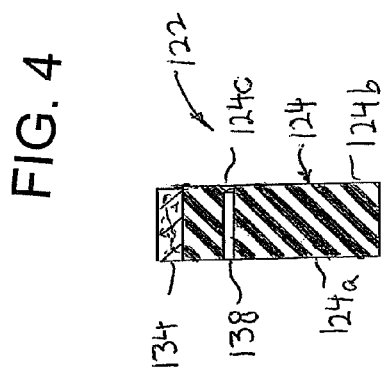
FIG. 4 is a cross-section view of the end doctor seal of FIG. 2, taken along line 4-4 thereof.

In accordance with a first aspect of the present invention, as shown in FIGS. 2-4, a blade/ink chamber seal 122 for use in a sealing assembly according to a first embodiment of the present invention for use with an anilox roll 12 and sealing blade 18 and doctor blade 20, includes a unitary, single-piece compressible member 124 of a generally parallelepiped configuration and made from a compressible material such as foam, rubber, felt, plastic or composite material. Compressible member 124 includes a first end section 126 and a second end section 128 connected together by a central section 130. The upper surface 130a of central section 130 has an arcuate configuration which conforms to the arcuate outer surface of anilox roll 12, while the upper surfaces 126a and 128a of first and second end sections 126 and 128 meet upper surface 130a of central section 130 at raised apices 129 and 131, respectively, and include flat surfaces that slope downwardly from upper surface 130a of central section 130. Generally, upper surface 128a on which doctor blade 20 seats has a greater inclination than upper surface 126a on which sealing blade 18 seats. Although not limited thereby, an example of dimensions of compressible member 124 are a length of 96.5 mm, a depth of 12.5 mm and a height ranging from 21.8 mm at the extreme end of upper surface 128a and 33.4 mm at the opposite end of upper surface 128a. Compressible member 124 further includes at least one through opening 132 therein for mounting compressible member 124 onto mechanical elements (not shown) of a holder (not shown) of the ink chamber, as is well known in the art.

Seal 122 preferably also includes a wear pad 134 fixed along upper surfaces 126a, 128a and 130a, as is also well known in the art, for example, as included in the seal sold by All Printing Resources, Inc. of Glendale Heights, Ill. under the designation APR TEAMFLEXO. Wear pad 134 is relatively thin, for example, on the order of about 6.35 mm (0.25 inch), although the present invention is not limited thereto. Wear pad 134 can be made of any suitable material that resists the wear of anilox roll 12 as anilox roll 12 rotates, for example, felt or the like. However, the present invention is not limited to the use of wear pad 134, and in fact, wear pad 134 can be eliminated.

Thus, while wear pad 134 resists wear as anilox roll 12 rotates, the compressible material of compressible member 124 compensates for tolerances in the system for frictional wear of the blades 18, 20 as they run again anilox roll 12.

However, the above construction is relatively stiff, in order to hold everything in place as anilox roll 12 exerts force on seal 122. This, however, is disadvantageous because it creates a higher force on blades 18, 20, and in particular, on the end of doctor blade 20 where seal 122, anilox roll 12 and doctor blade 20 meet.

As a result, because there is more force by seal 122 on each blade 18, 20, that is, at the ends of blades 18, 20 where they are held, the ends of blades 18, 20 are less capable of flexing or bending at these points. As a result, there is uneven wear on the ends of blades 18, 20 adjacent seal 122, which tends to cause more wear and more leakage of ink at the ends of anilox roll 12. Further, ink tends to ride under blades 18, 20, that is, between blades 18, 20 and the flat supporting areas 126a, 128a of seal 122, causing blades 18, 20 to lift up away from seal 122, thereby resulting in still more leakage. Thus, the place where seal 122, anilox roll 12 and blades 18, 20 join, is particularly susceptible to leakage.

In order to overcome this problem, the present invention provides a feature which relieves the pressure or force only a positions of blades 18, 20 where they meet anilox roll 12. Specifically, the present invention, as shown in FIGS. 1-3 provides a narrow hollow space or pressure relieving recess 136 in compressible member 124 immediately below positions where blades 18, 20 meet anilox roll 12. In the embodiment of FIGS. 1-3, each hollow space 136 is provided in the form of a thin recess 138 of a semi-circular cross-section, that extends transversely through a first side 124a of compressible member 124 but does not extend entirely through the opposite second side 124b of compressible member 124, thereby forming a thin membrane 124c at the opposite second side 124b of compressible member 124, in order to prevent leakage of fluid therethrough. In other words, recess 138 is closed at second side 124b. Semi-circular recess 138 preferably has a curvature such that it curves upwardly from ends thereof.

Hollow space 136 thereby functions as a pressure relief that reduces the pressure on blades 18, 20, when needed, and thereby reduces the uneven wear on blades 18, 20.

Figure 6:
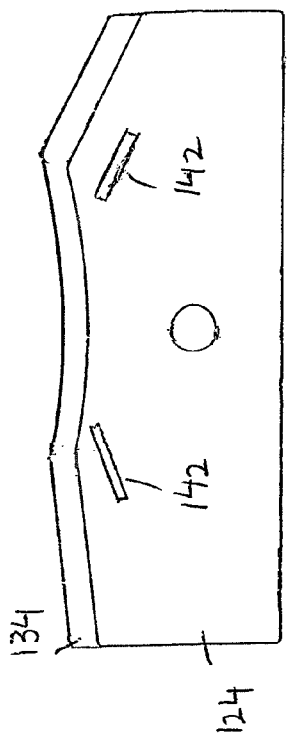
FIG. 6 is a side elevational view of an end seal according to a third embodiment of the present invention.
Figure 5:
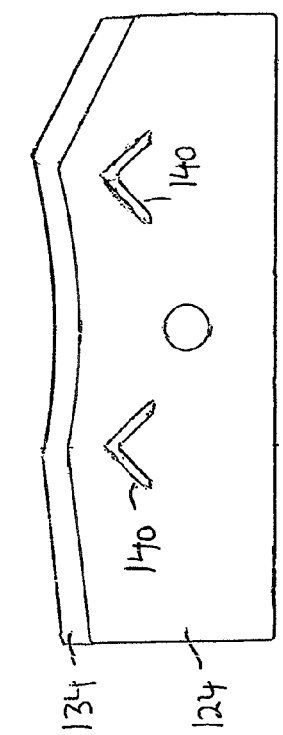
FIG. 5 is a side elevational view of an end seal according to a second embodiment of the present invention.
Figure 7:
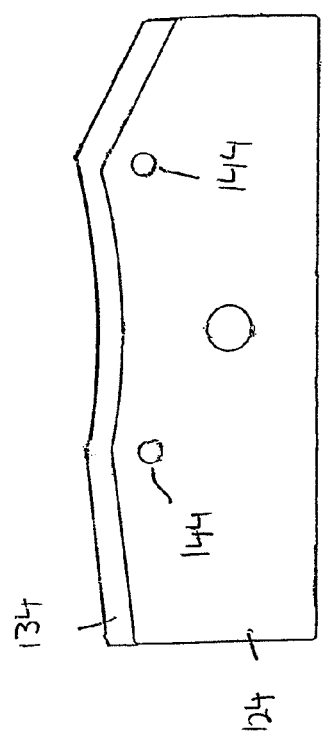
FIG. 7 is a side elevational view of an end seal according to a fourth embodiment of the present invention.

Although the present invention has been discussed in relation to hollow spaces 136 being in the form of semi-circular recesses 138, the present invention is not limited thereto, and any other suitable shape can be utilized. For example, other configurations, such as recesses 140 having an inverted V-shaped cross-section (FIG. 5), recesses 142 having an inclined planar cross-section (FIG. 6) or even recesses 144 having a small circular cross-section (FIG. 7) can be provided.

Figure 8:
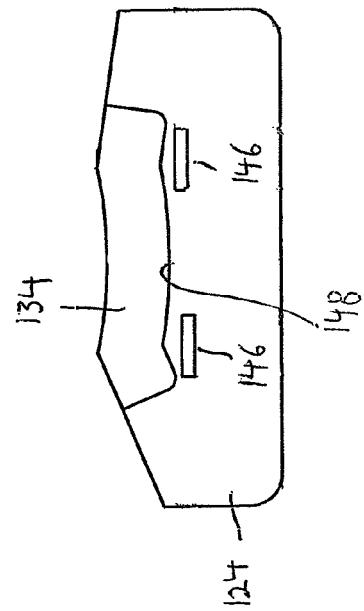
FIG. 8 is a side elevational view of an end seal according to a fifth embodiment of the present invention.

A still further configuration is shown by the recesses 146 in FIG. 8 having a horizontal planar cross-section. In this seal, a wear pad recess 148 is provided in central section 130 and extends only partially into first and second end sections 126 and 128.

Preferably, each pressure relieving recess 136 extends below said central section 130 and one end section 126, 128.

In each case, however, thin membrane 124c would always be provided.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention as defined by the appended claims.

What is claimed is:

1. An end seal for a fluid chamber which supplies fluid to a roll, comprising:
    a generally compressible member having first and second opposite sides and including:
        a first end section having a first inclined planar upper surface,
        a second end section having a second inclined planar upper surface, and
        a central section which connects together said first and second end sections, said central section having an arcuate upper surface for receiving the roll, said arcuate upper surface connected to said first and second inclined planar upper surfaces, and
        an overall length extending across the first end section, the central section and the second end section;
    a first pressure relieving recess positioned in said compressible member at a position below a connection of said arcuate upper surface and said first inclined planar upper surface, said first pressure relieving recess extending substantially through the compressible member and being open at said first side of the compressible member and terminating short of the second opposite side of the compressible member so as to define a membrane of the compressible member at the second side which prevents fluid traveling through the first pressure relieving recess between the first and second sides;
    a second pressure relieving recess positioned in said compressible member at a position below a connection of said arcuate upper surface and said second inclined planar upper surface, said second pressure relieving recess extending substantially through the compressible member and being open at said first side of the compressible member and terminating short of the second opposite side of the compressible member so as to define a membrane of the compressible member at the second side which prevents fluid traveling through the first pressure relieving recess between the first and second sides,
    the first and second pressure relieving recesses being discrete and separate from each other;
    each pressure relieving recess not extending substantially entirely along the overall length of the compressible member; and
    a solid area between said first and second pressure relieving recesses and below said arcuate upper surface which ensures that said first and second pressure relieving recesses are not connected to each other.

2. An end seal according to claim 1, wherein at least one said pressure relieving recess has an inverted V-shaped configuration.

3. An end seal according to claim 1, wherein at least one said pressure relieving recess has an inclined planar cross-sectional configuration.

4. An end seal according to claim 1, wherein at least one said pressure relieving recess has a small circular cross-sectional configuration.

5. An end seal according to claim 1, wherein at least one said pressure relieving recess has a horizontal planar cross-sectional configuration.

6. An end seal according to claim 1, wherein at least one said pressure relieving recess extends partially below said central section and a respective said end section.

7. An end seal according to claim 1, wherein said compressible member includes at least one through opening for mounting the compressible member to the fluid chamber.

8. An end seal according to claim 1, further comprising a wear pad that seats on the upper surface of the central section.

9. An end seal according to claim 8, wherein the wear pad is made from at least one material selected from the group consisting of felt, ultra-high molecular weight polyethylene (UHMWPE) and polyester.

* * * * *